(12) United States Patent
Yap et al.

(10) Patent No.: US 11,350,248 B2
(45) Date of Patent: May 31, 2022

(54) METHOD AND APPARATUS FOR OPERATING AN INTERNET-OF-THINGS DEVICE WITHIN A PUSH-TO-TALK TO INTERNET OF THINGS SYSTEM

(71) Applicant: MOTOROLA SOLUTIONS, INC., Chicago, IL (US)

(72) Inventors: Chin Chuan Yap, Bayan Lepas (MY);
Kean Aik Low, Sungai Petani (MY);
Kah Chun Chin, Bayan Lepas (MY);
Tian Hong Teh, Bayan Lepas (MY);
Brian J Frommelt, Deer Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 227 days.

(21) Appl. No.: 16/879,064

(22) Filed: May 20, 2020

(65) Prior Publication Data

US 2021/0368303 A1 Nov. 25, 2021

(51) Int. Cl.
| | |
|---|---|
| *H04W 4/10* | (2009.01) |
| *H04L 67/12* | (2022.01) |
| *G10L 15/22* | (2006.01) |
| *G10L 15/18* | (2013.01) |
| *G16Y 40/30* | (2020.01) |

(52) U.S. Cl.
CPC ............... *H04W 4/10* (2013.01); *G10L 15/18* (2013.01); *G10L 15/22* (2013.01); *H04L 67/12* (2013.01); *G10L 2015/223* (2013.01); *G16Y 40/30* (2020.01)

(58) Field of Classification Search
CPC ............. H04L 12/2803; H04L 12/2809; H04L 12/2816; H04L 12/282; H04L 67/12; G10L 15/18; G10L 15/22; G10L 2015/223; H04W 4/38; H04W 4/90; H04W 76/50; G16Y 40/30
See application file for complete search history.

(56) References Cited

U.S. PATENT DOCUMENTS

| | | | |
|---|---|---|---|
| 9,280,516 B2 | 3/2016 | Jiang | |
| 10,012,987 B2 | 7/2018 | Tov et al. | |
| 10,129,711 B1 * | 11/2018 | Saadoun | ............... H04W 8/186 |
| 10,332,383 B1 * | 6/2019 | Giles | .................... G08B 25/008 |
| 10,341,824 B1 | 7/2019 | Tov et al. | |
| 2017/0213002 A1 | 7/2017 | Jha et al. | |

(Continued)

FOREIGN PATENT DOCUMENTS

| | | | |
|---|---|---|---|
| EP | 3470939 A1 | 4/2019 | |
| WO | WO 2019083442 | * 5/2019 | ......... G06K 9/00771 |

*Primary Examiner* — Tonia L Dollinger
*Assistant Examiner* — Linh T. Nguyen

(57) ABSTRACT

A method and apparatus for PTT over IoT is described herein. During operation, each IoT device will be assigned to a talkgroup. Some talkgroups may have a single IoT device assigned, and other talkgroups may have multiple IoT devices assigned. During operation, a control command is received over a first talkgroup that is used to control a first IoT device assigned to that talkgroup. Prior to executing the control command, a set of secondary IoT devices will be determined based on a task assigned to the officer. The secondary IoT devices will be accessed to determine their statuses. The status of the secondary IoT devices will be used as a trigger as to whether or not to allow the control command to be sent to the first IoT device.

7 Claims, 6 Drawing Sheets

(56) References Cited

U.S. PATENT DOCUMENTS

| | | | |
|---|---|---|---|
| 2018/0167774 A1* | 6/2018 | Hodge | H04W 4/029 |
| 2018/0330589 A1* | 11/2018 | Horling | G06F 3/167 |
| 2018/0359808 A1* | 12/2018 | Lee | H04M 3/42 |
| 2019/0050238 A1* | 2/2019 | Lim | G06F 9/453 |
| 2019/0121497 A1* | 4/2019 | Tov | H04L 67/12 |

* cited by examiner

METHOD AND APPARATUS FOR OPERATING AN INTERNET-OF-THINGS DEVICE WITHIN A PUSH-TO-TALK TO INTERNET OF THINGS SYSTEM

BACKGROUND OF THE INVENTION

The Internet of Things (IoT) refers to the connection of every-day devices to the Internet. Devices such as cars, kitchen appliances, medical devices, doors, windows, HVAC systems, drones, chemical sensors, temperature sensors, . . . , etc. can all be connected through the IoT. Basically, anything that can be powered can be connected to the internet to control its functionality or to retrieve information from the device. The IoT allows objects to be sensed or controlled remotely across existing network infrastructure, creating opportunities for more direct integration of the physical world into computer-based systems, and resulting in improved efficiency, accuracy, and control.

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

Because PTT and talkgroups are so ubiquitous in the public-safety realm, it would be beneficial if PTT and talkgroups could be used to control devices for the IoT. It would also be beneficial if the things controlled by particular talkgroup were allowed or disallowed to better support a public-safety officer's safety in moments that matter.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
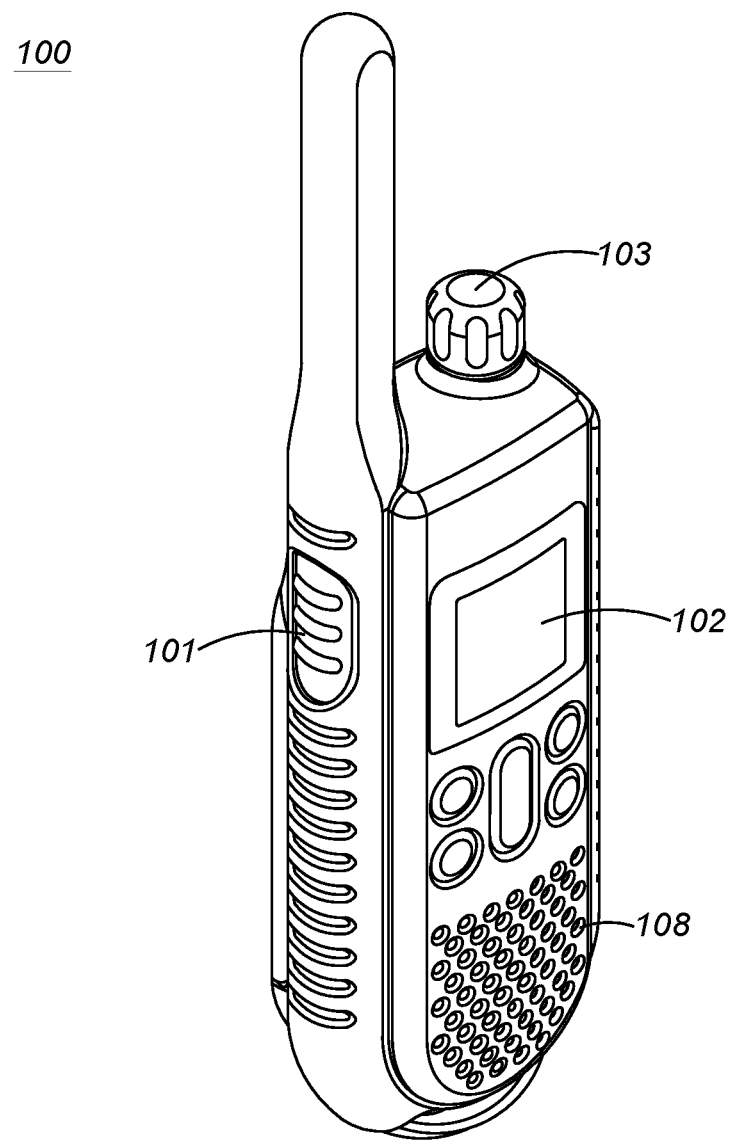
FIG. 1 illustrates push-to-talk (PTT) radio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for PTT over IoT is described herein. During operation each IoT device will be assigned to a talkgroup. Some talkgroups may have a single IoT device assigned, and other talkgroups may have multiple IoT devices assigned. During operation, a control command is received over a first talkgroup that is used to control a first IoT device assigned to that talkgroup. Prior to executing the control command, a set of secondary IoT devices will be determined based on a task assigned to the officer. The secondary IoT devices will be accessed to determine their statuses. The status of the secondary IoT devices will be used as a trigger as to whether or not to allow the control command to be sent to the first IoT device.

Consider the following example: A firefighter is assigned to fight a fire in a building. The firefighter wishes to open a locked IoT door (primary IoT device) by sending the door (via PTT) a control command to open. However, unknown to the firefighter, a poisonous gas has filled the room that the firefighter wishes to enter. Opening the door will release the gas to the rest of the building. The control command is received by a PTT-to-Things server along with the assignment for the firefighter. Based on the assignment, the PTT-to-Things server will determine secondary IoT devices whose statuses need to be checked prior to opening the locked door. One of these secondary IoT devices is a poison gas detector. If the status of the poison gas detector is that it is currently detecting poison gas, then the PTT-to-Things server will not open the door. If, however, the status of the poison gas detector is that no poison gas has been detected, then the PTT-to-Things server will open the door.

A warning may be provided to the firefighter when poison gas has been detected. The firefighter may be given a chance to override the PTT-to-Things server in order to open the door. For example, if the firefighter is equipped with personal protection to protect against the poison gas (e.g., a breathing apparatus), the firefighter may again issue the control command to open the locked door. This will cause the PTT-to-Things server to then issue the control command to the door to be opened or unlocked.

As will be discussed below, the primary IoT device is determined by the PTT-to-Things server by determining the identity of the talkgroup that was utilized to transmit a control command to the PTT-to-Things server. In other words, a user sends a command over a talkgroup to control an IoT device, and the particular IoT device is uniquely determined by the identity of the talkgroup used to send the command. As is evident, secondary IoT devices will be determined by the PTT-to-Things server as well. The status of the secondary IoT devices will be checked prior to issuing any control command. The secondary IoT devices determined will be based on one, or multiple of the following:
- the public-safety event assigned to the person wishing to control the primary IoT device;
- the control command received to control the primary IoT device; and
- the identity of the primary IoT device.

The public-safety event that is assigned to the user wishing to control the primary IoT device may be determined by the PTT-to-Things server determining a current incident assigned to an officer. A computer-aided dispatch (CAD) incident identifier can be utilized to determine a current incident associated with the officer. More particularly, an incident identification (sometimes referred to as an incident scene identifier, or a CAD incident identifier (CAD ID), or Incident Number) is generated for incidents where an officer is dispatched/assigned, or where an officer encounters a public-safety event. This ID (to which the officer is assigned) could be something as simple as a number associated with a particular incident, or something as complicated as an identification that is a function of populated fields (e.g., time, location, incident type, . . . , etc.), one of which may comprise an incident type. Incident Type is a descriptor of the nature of the event. Incident type may be as simple as "Law", "Police", "Fire", or "EMS" but can be as specific as "Multiple car accident with rollover, injuries, and entrapment" or "Structure fire, multi-level, flammables on scene". Every Incident is assigned both an ID and a type.

It should be noted that the "control command" described above may simply be any transmission received over a particular talkgroup, even a simple keying of a microphone, with no other voice or data transmission (i.e., the received "control command" comprises an un-modulated carrier signal with no data or voice). In other words, sinusoidal signal that is used in the modulation is known as the carrier signal, or simply "the carrier". The signal that is used in modulating the carrier signal (or sinusoidal signal) is known as the "data signal" or the "message signal". It is important to notice that a simple sinusoidal carrier contains no information of its own, and may be used to control IoT devices as described.

However, in alternate embodiments, an "control command" may comprise information modulated on the carrier signal, for example, the utterance of specific words, for example, "unlock the door", "open the door", "close the door", "turn on the lights", "lockdown", . . . , etc. So for example, in a first embodiment, a radio tuned to a door talkgroup may open a door associated with the talkgroup by tuning their radio to the door talkgroup and keying their microphone by pushing the PTT button on their radio. In a second embodiment, a radio tuned to the door talkgroup may open the door associated with the talkgroup by simply tuning their radio to the door talkgroup, keying their microphone by pushing the PTT button on their radio, and uttering "open the door" into their radio.

As discussed above, the secondary IoT devices may be based on the control command that will be issued to the primary IoT device. Thus, for example, if a command was given to close a door, then the secondary devices determined by the PTT-to-Things server may not comprise poison gas sensors, but may comprise, for example, motion detectors to determine if anyone is left in the room. (It is assumed that there is no need to check for poison gas if someone wishes to close the door, however, it may be necessary to determine if someone will be left in the room).

Finally, the secondary IoT devices may be determined based on the identity of the primary IoT devices, so for example, a first set of secondary devices are chosen if a first primary IoT device is accessed (e.g., a door), and a second set of secondary devices are chosen if a second primary IoT device is accessed (e.g., lights).

FIG. 1 illustrates push-to-talk (PTT) radio 100. As shown, radio 100 comprises PTT button 101, knob 103, display/screen 102, and speaker/microphone 108. PTT button 101 comprises a standard button, that when pressed, transitions radio 100 from a listening state, to a transmit state, transmitting over a specific talkgroup. Display 102 comprises a way of conveying (e.g., displaying) PTT information to the user. In particular, in an embodiment, a talkgroup may be displayed to the user as an alpha-numeric output on display 102. Display 102 may simply comprise a liquid-crystal display (LCD), or may comprise additional types of displays (e.g., a light-emitting diode (LED) display). Display 102 may also comprise a touch-screen display that provides both an output interface and an input interface between the device and a user. Display 102 may also provide graphics, video, and any combination thereof.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to highlight a particular talkgroup, any activation (pushing) of the PTT button 101 will cause radio 100 to communicate over the highlighted talkgroup.

Figure 2:
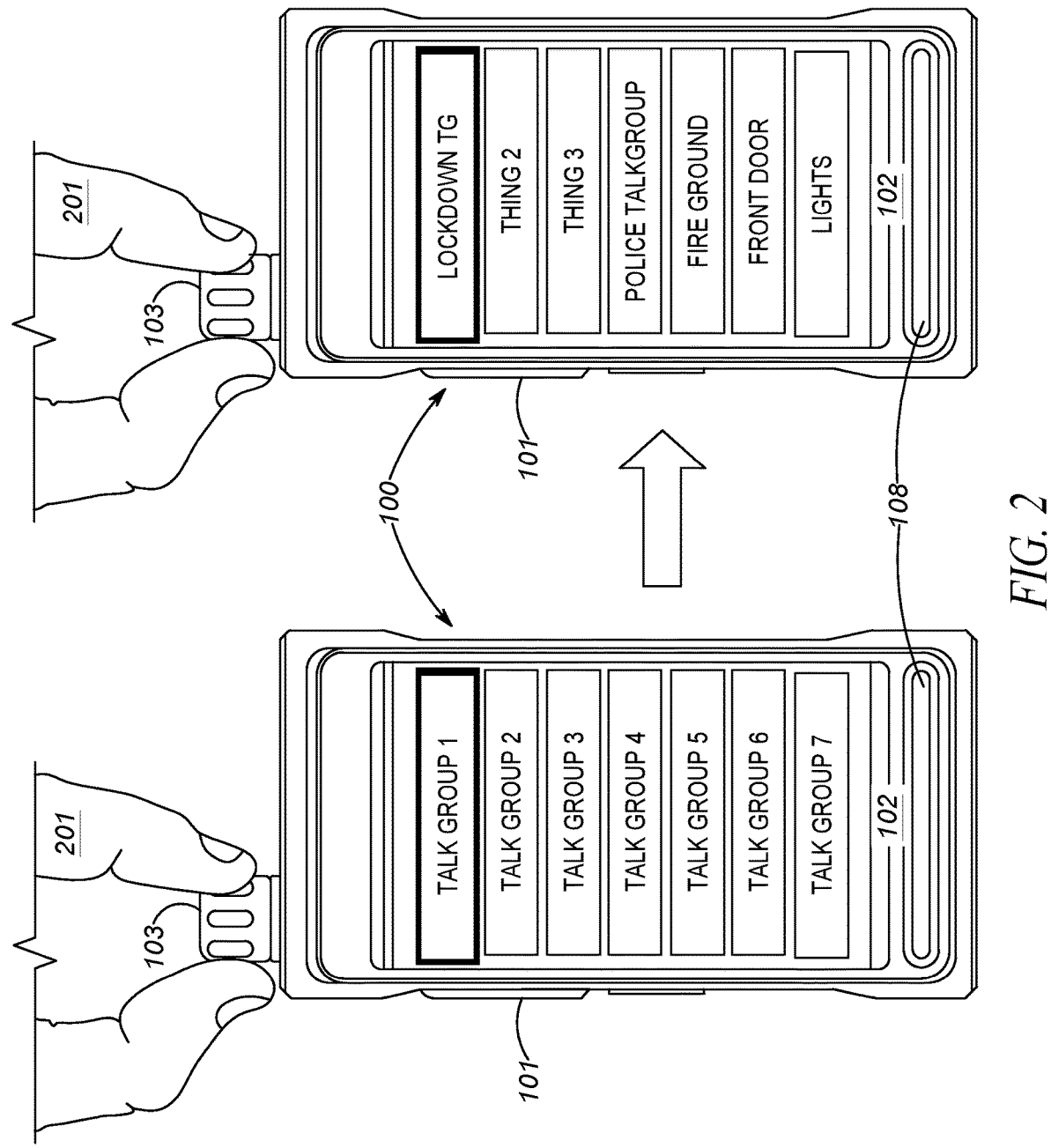
FIG. 2 Illustrates push-to-talk (PTT) radio with multiple talkgroups associated with IoT devices.

It should be noted that display 102 may display the names of the talkgroups, which include the names of IoT devices that are controlled by pushing the PTT button. For example, as shown in FIG. 2, the Police Talkgroup and the Fire ground talkgroup may be displayed, so when highlighted, communications to other police officers, or firemen take place upon the pushing of the PTT button 101. However, as shown, IoT devices may also be displayed, such as Front Door, Lights, Lockdown Talkgroup, Thing 2, Thing 3, . . . , etc. When an IoT device is highlighted, activation of the PTT button will cause the IoT device (or a group of devices) to function.

In order to accomplish the above, a PTT-to-Things Server is provided that is a member of IoT talkgroups. Communication to the PTT-to-Things server over a particular talkgroup causes the PTT-to-Things server to map the talkgroup to a particular IoT device (or group of IoT devices), and potentially to a particular protocol to control an IoT device. The PTT-to-Things server can then instruct the particular IoT device to perform an action after appropriate secondary IoT devices statuses are checked.

As is known in the art, modern two-way radio systems comprise talkgroups, where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup. In the present invention, server 301 is provided that is a member of talkgroups that are assigned to a "thing" connected to the IoT. This is illustrated in FIG. 3.

Figure 3:
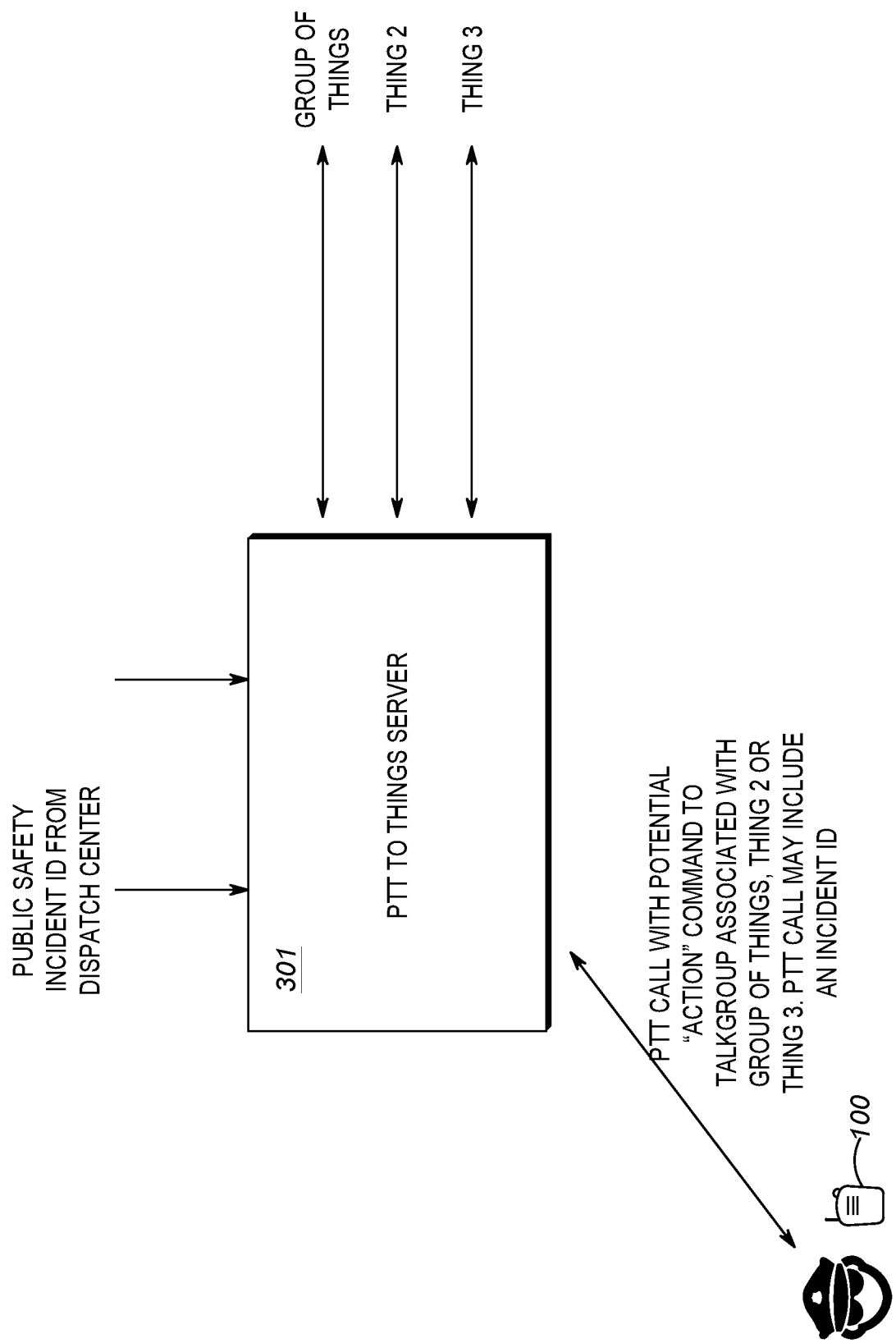
FIG. 3 illustrates a PTT-to-Things server.

As shown in FIG. 3, PTT-to-Things server 301 is shown in communication with radio 100. PTT-to-Things server 301 is a member of a plurality of talkgroups. When PTT-to-Things server 301 receives a PTT call over a particular talkgroup to which it is a member, PTT-to-Things server 301 will map the particular talkgroup identification to an IoT device (or a group of IoT devices) to determine the primary IoT device. More particularly, the primary IoT device will comprise the IoT identified by the talkgroup.

PTT-to-Things server 301 will then determine the public-safety event assigned to the person wishing to control the primary IoT device. The public-safety event is preferably determined via a CAD_ID that is provided to the PTT-to-Things server 301 by radio 100, or alternatively, provided to PTT-to-Things server 301 by, for example, a public-safety dispatch center (not shown in FIG. 3).

PTT-to-Things server 301 will then determine the control command received to control the primary IoT device. As discussed, the control command may be inferred by simply receiving a transmission over the talkgroup, or the control command may comprise a voice command that is transmitted over the talkgroup.

Once the identification of the primary IoT device, the public-safety event assigned to the officer, and the control command are determined, then PTT-to-Things server 301 will determine at least one secondary IoT device. The secondary IoT device may be determined by mapping the identification of the primary IoT device, the public-safety event assigned to the officer, and the control command to the secondary IoT device. The mapping process preferably comprises an operation that associates each element of a given set (the domain) with one or more elements of a second set (the range). The identification of the primary IoT device, the public-safety event assigned to the officer (incident), and the control command comprises the domain, while the secondary devices comprise the range. The mapping may be explicit based on predefined rules, or the mapping may be trained via neural network modeling. The mapping produces the identifications of the secondary devices.

More specifically, if an identification of the primary IoT device (a) is an element of groups of possible primary IoT devices A (i.e., a∈A) and if the public-safety event assigned to the officer (b) is an element of groups of possible public-safety events that can be assigned to the officer B (i.e., b∈B), and if the control command (c) is an element of possible control commands (C) that can be used to control the primary IoT device (i.e., c∈C), then The set (A,B,C) is called the domain of the function F. The set of possible outcomes of F(a,b,c) results in identities of secondary devices, and is called the range. The mapping may be explicit based on predefined rules (as shown in Table 1), or the mapping may be trained via neural network modeling. The mapping process preferably comprises an operation that associates each element of a given set (the domain) with one or more elements of a second set (the range). The identification of the primary IoT device, the public-safety event assigned to the officer (incident), and the control command comprises the domain, while the identities of the secondary IoT devices comprise the range. For example, y=F(a,b,c), where y is the range and a,b,c is the domain. If y the identifications of the secondary devices (range) and identification of the primary IoT device, the public-safety event assigned to the officer (incident), and the control command comprises the domain, then:

Secondary devices=Function(identification of the primary IoT device, the public-safety event assigned to the officer (incident), and the control command).

It should be noted that a particular IoT protocol to control the primary IoT device may need to be determined. PTT-to-Things server 301 will then determine IoT communicate with the IoT device to cause the IoT device to perform a particular action.

As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

Once secondary devices are determined and their statuses checked, in a further embodiment, a first instruction may be provided to the IoT device upon detecting transmission upon the particular talkgroup, and a second instruction may be provided to the IoT device upon detecting that no further transmission is being received on the talkgroup. (It should be noted that "transmission" comprises simply opening up the channel (transmitting the carrier signal) by pushing the PTT button, no voice needs to be detected). As an example, a user may switch their radio to a talkgroup associated with lighting in a room. Pushing and holding the PTT button may cause the lights to go on, while un-pressing the PTT button may cause the lights to go off. This entails PTT-to-Things server 301 to send an instruction to the lights to turn on upon detecting any transmissions on a particular talkgroup (even the carrier), and then instructing the lights to go off upon detecting that transmissions on a particular talkgroup has ceased.

So, for example, in FIG. 3, user of radio may wish to control "Thing 3" by issuing an appropriate first control command over a talkgroup that can be mapped to Thing 3. Prior to controlling Thing 3, server 301 will use the identity of Thing 3, the incident ID assigned to the user of radio 100, and the control command to determine that "Group of Things" needs to have their statuses determined prior to issuing the control command. Once the statuses have been determined, the control command can be issued, or alternatively, the control command will not be sent and the reason may be provided back to radio 100. If a second control command is received that is similar to the first control command, then server 301 may provide the control command to Thing 3.

Figure 4:
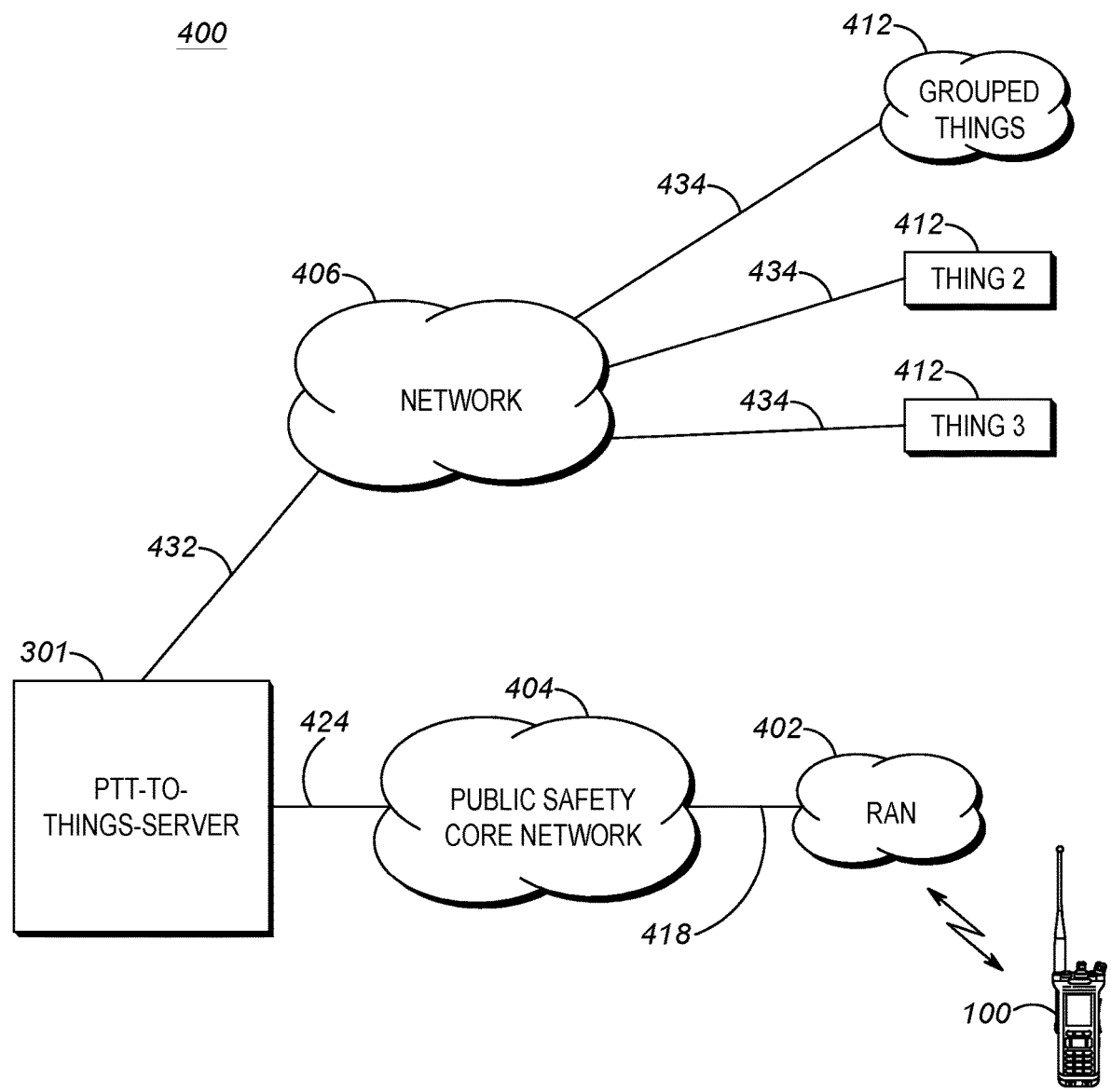
FIG. 4 depicts an example communication system that incorporates a PTT-to-Things server.

FIG. 4 depicts an example communication system 400 that incorporates PTT-to-Things server 301. It should be noted that the communication system depicted in FIG. 4 comprises a typical public-safety communication system modified with a PTT-to-Things server. However one of ordinary skill in the art would recognize that other system may be modified to encompass PTT-to-Things server 301 such as, but not limited to a cellular communication system, a cloud-based communication system, . . . , etc. System 400 includes one or more radio access networks (RANs) 402, a public-safety core network 404, PTT radio 100, IoT devices 412, PTT-to-Things server 301, and communication links 418, 424, 432, and 434.

RAN 402 includes typical RAN elements such as base stations, base station controllers (BSCs), routers, switches, and the like, arranged, connected, and programmed to provide wireless service to user equipment (e.g., radio 100, and the like) in a manner known to those of skill in the relevant art. RAN 402 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 402 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 402 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 404 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 404 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radio 100 may be any suitable computing and communication device configured to engage in wireless communication with the RAN 402, and ultimately to PTT-to-Things server 301 over the air interface as is known to those in the relevant art. It should also be noted that any one or more of the communication links 418, 424, 432, and 434 could include one or more wireless-communication links and/or one or more wired-communication links.

Expanding on the above, each user of the system may possess a radio to communicate over many differing talkgroups. Communication on various talkgroups will be routed by RAN 402 and network 404 to PTT-to-Things server 301. When PTT-to-Things server 301 receives a communication over a particular talkgroup from any radio 100, PTT-to-Things server 301 will map the particular talkgroup identification to an IoT device 412 (or group of IoT devices). Secondary IoT devices will be determined as described above. Communication to a particular IoT device 412 (or group of devices if multiple IoT devices 412 are associated with the same talkgroup) will take place via communication links 432/434 and intervening network 406.

Network 406 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

With the above in mind, PTT-to-Things server 301 may also be configured with a natural language processing (NLP) engine (not shown in FIG. 4) configured to determine an "control command" from any over-the-air voice transmissions received by radio 100. The NLP engine may also analyze oral queries and/or statements received by any user and provide responses to the oral queries and/or take other actions in response to the oral statements. It should be noted that any over-the-air communication between users (e.g., on the talkgroup) will be monitored by the NLP engine in order to determine the content of the over-the-air voice transmission.

Figure 5:
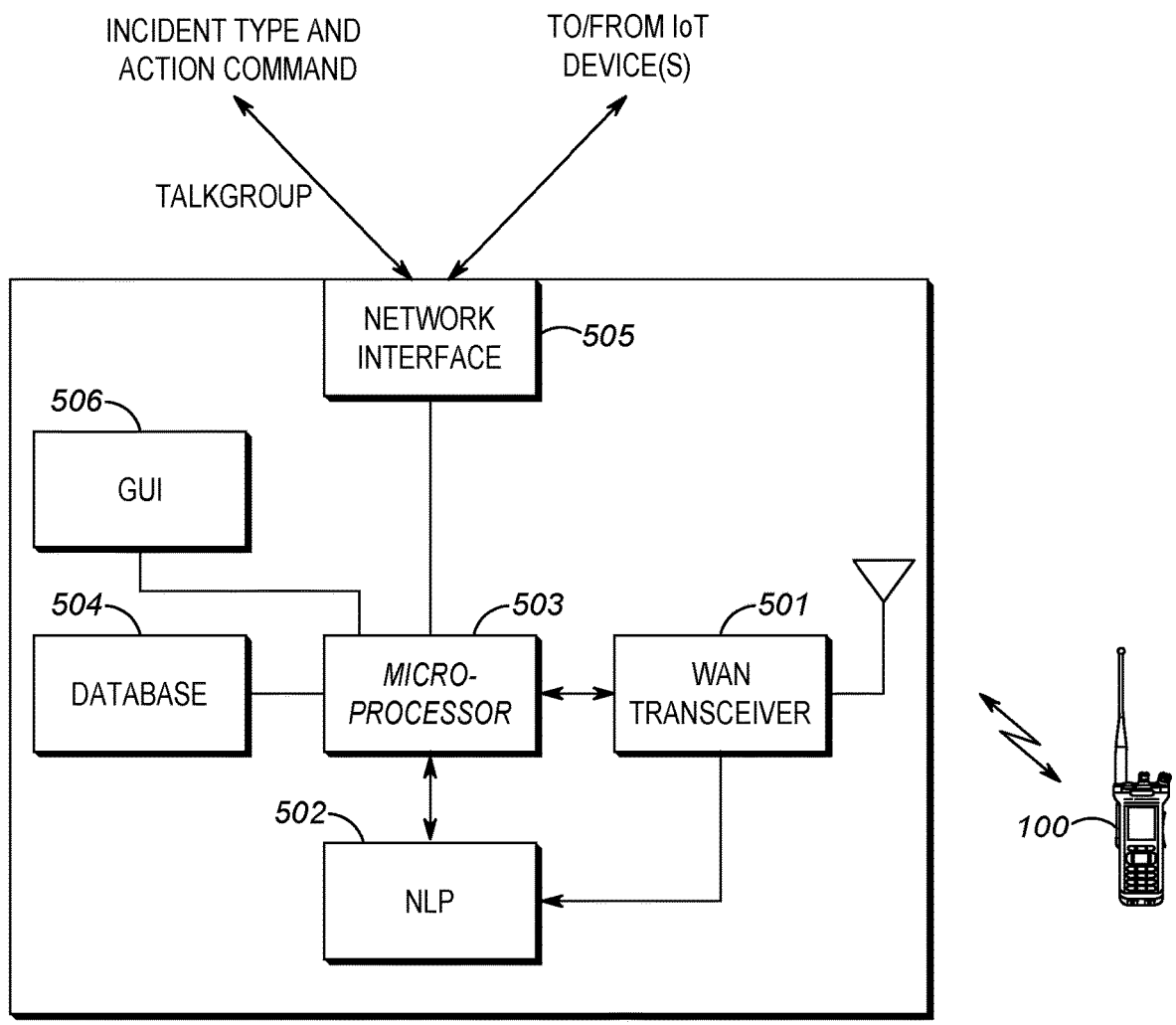
FIG. 5 is a block diagram of a PTT-to-Things server.

FIG. 5 is a block diagram PTT-to-Things server 301. In an embodiment, PTT-to-Things server 301 is embodied within a dispatch center, however in alternate embodiments the device may be embodied within the public-safety core network 404, or more computing devices in a cloud compute cluster (not shown), or some other communication device not illustrated in FIG. 4, and/or may be a distributed communication device across two or more entities.

FIG. 5 shows those components (not all necessary) for PTT-to-Things server 301 to receive a communication from a radio over a particular talkgroup, map the particular talkgroup to an IoT device(s), determine and check the status of secondary IoT devices, and send an appropriate command to the IoT device. The components shown in FIG. 5 are also configured to receive a control command (a particular command that controls the IoT device) and a public-safety incident, as determined from, for example, an incident ID. (It should be noted that the incident ID is used to determine the particular event but the "type" of event may also be determined from the incident ID). From this information, an IoT device may be controlled by server 301 after determining the identities of secondary devices as well as determining the statuses of the secondary devices. The control command, incident ID, and incident type may come from any network source, radio 100, or graphical-user interface 506 that may be operated by a dispatch control officer. In some cases, the incident ID and type may be initially created by a responder (e.g., officer initiated traffic stop) and then used by the dispatcher for the remainder of the response to that incident.

As shown, PTT-to-Things server 301 may include a wide-area-network (WAN) transceiver 501 (e.g., a transceiver that utilizes a public-safety communication-system protocol), Natural Language Processor (NLP) 502, logic circuitry 503, database 504, network interface 505, and GUI 506. In other implementations, PTT-to-Things server 301 may include more, fewer, or different components. Regardless, all components are connected via common data busses as known in the art.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network. WAN transceiver 501 receives communications from users over a particular talkgroup. It should be noted that WAN transceiver 501 is shown as part of PTT-to-Things server 301, however, WAN transceiver 501 may be located in RAN 402 (e.g., a base station of RAN 202), with a direct link to PTT-to-Things server 301.

NLP 502 may be a well-known circuitry to analyze, understand, and derive meaning from human language in a smart and useful way. By utilizing NLP, automatic summarization, translation, named entity recognition, relationship extraction, sentiment analysis, speech recognition, and topic segmentation can take place. This allows server 301 to determine the intent of any voiced control command.

Logic circuitry 503 comprises a digital signal processor (DSP), general purpose microprocessor, a programmable logic device, or application specific integrated circuit (ASIC) and is configured to determine a primary IoT device by mapping a talkgroup to the primary IoT device, and alternatively also map a talkgroup and potentially a received utterance to a command given to an IoT device. For example, consider a public-safety officer that is approaching a room with a locked door. The public-safety officer can initiate a PTT call using a particular talkgroup. WAN transceiver may detect the transmission and provide the transmission to logic circuitry 503. Logic circuitry 503 can (via mapping) determine that the talkgroup is associated with the locked door. Logic circuitry 503 then can instruct all actuators for the door to be opened after appropriate secondary IoT devices are determined and have their status checked.

The mapping process for determining a primary IoT device preferably comprises an operation that associates each element of a given set (the domain) with one or more elements of a second set (the range). The talkgroup and potentially a control command comprises the domain, while the IoT device and command the range. The mapping is preferably explicit based on predefined rules (e.g., talkgroup 423 is assigned to door lock 1).

Logic circuitry 503 is also configured to map an identification of the primary IoT device, a control command, and an incident ID to secondary devices as described above. During operation, the status of the secondary devices will be used to determine whether or not to control the primary IoT device, as described above.

Database 504 is provided. Database 504 comprises standard memory (such as RAM, ROM, . . . , etc) and serves to store talkgroup/IoT device pairs. Database 504 may also comprise rules used to determine secondary IoT devices and also determine what status of the secondary devices prevent controlling the primary IoT device. This is illustrated in Tables 1, 2, and 3 below:

TABLE 1

Mapping of talkgroup to device and instruction when no verbal control command is used

| Talkgroup | IoT Device | Instruction (control command) | Address of IoT device(s) |
|---|---|---|---|
| 4320 | Lock at the Police Station | Switch from lock to unlock, or vice versa | 10.66.123 |
| 4356 | Light at the Police Station | Switch light from off to on or vice versa | 10.66.124 |
| 6748 | Lockdown TG | Lockdown all devices | 10.66.125, 12.45.1.123, 155.133.11.2, . . . |
| . . . | . . . | . . . | . . . |

TABLE 2

Mapping of talkgroup to device and instruction when control command is used

| Talk group | Device | Verbal Control command | Instruction (control command) | Address of IoT device |
|---|---|---|---|---|
| 4320 | Lock at the Police Station | unlock | Switch from lock to unlock | 10.66.124 |
| 4320 | Lock at the Police Station | lock | Switch from unlock to lock | 10.66.124 |
| 4356 | Light at the Police Station | off | Turn light off | 10.66.125 |
| 4356 | Light at the Police Station | on | Turn light on | 10.66.125 |
| . . . | . . . | . . . | . . . | . . . |

TABLE 3

Mapping of incident ID, incident type, primary IoT device, and Control command to Secondary IoT device.

| Incident ID | Incident Type | Primary IoT devices | Control command | Secondary IoT devices | Trigger to prevent controlling primary IoT device |
|---|---|---|---|---|---|
| Fire | Fire | Door at building 123 Main St. | Open Door | Smoke detector at 123 main street and motion detector at 123 main street | Smoke detected, however if motion is detected then allow door to be opened |
| Fire | Fire | Door at 234 Oak Street | Close Door | Motion Sensor | Motion detected in room |
| Robbery | Robbery | First National Bank | Lock Doors | Motion Sensor | Motion detected in room |
| . . . etc. | . . . etc. | . . . etc. | . . . etc. | . . . etc. | . . . etc. |

GUI 506 provides a man/machine interface for receiving an input from a user and displaying information. For example, GUI 506 may provide a way of conveying (e.g., displaying) information received from processor 503. Part of this information may comprise necessary information on the sensor statuses and identities of primary and secondary IoT devices. GUI 506 may also provide a way for inputting an incident ID and location to logic circuitry 503. In order to provide the above features (and additional features), GUI 506 may comprise any combination of a touch screen, a computer screen, a keyboard, or any other interface needed to receive a user input and provide information to the user.

Finally, network interface 505 provides processing, modulating, and transceiver elements that are operable in accordance with any one or more standard or proprietary wireless interfaces, wherein some of the functionality of the processing, modulating, and transceiver elements may be performed by means of the logic circuitry 503 through programmed logic such as software. Examples of network interfaces (wired or wireless) include Ethernet, T1, USB interfaces, IEEE 802.11b, IEEE 802.11g, etc.

With the above in mind, FIG. 5 illustrates an apparatus comprising a transceiver (501) configured to receive a control command to control a primary IoT device and provide the control command to logic circuitry 503. Logic circuitry 503 is configured to determine the identity of the primary IoT device, determine a secondary IoT device based on the control command, a public-safety event type, and the identity of the primary IoT device, and access the secondary IoT device to determine a status of the secondary IoT device. As discussed above, the primary IoT device will not be controlled with the control command (prevented from being controlled by logic circuitry 503) when the status of the secondary IoT device comprises a first status. However, logic circuitry 503 will allow the controlling of the primary IoT device when the status of the secondary IoT device comprises a second status.

Controlling the primary IoT device entails logic circuitry 503 forwarding an appropriate command from logic circuitry 503 to the primary IoT device via network interface 505. Thus, network interface 505 is shown coupled to logic circuitry 503, network interface 505 configured to output the control command to an address of the primary IoT device associated with the talkgroup in order to operate the IoT device.

As discussed, the control command may be received over a talkgroup associated with a primary IoT device, wherein the control command is intended to control the primary IoT device, and wherein the identity of the primary IoT device is determined by mapping the talkgroup to the identity of the primary IoT device.

As discussed, a the primary IoT device may comprise at least a door, a light, a sensor, a switch, an actuator; and the control command for the primary IoT device comprises a command to lock/unlock the door, turn on/off the light, or actuate the switch or actuator.

As discussed, the public-safety event type may be determined via a computer-aided dispatch (CAD) identification (ID) or incident number. Additionally, the control command may comprise a verbal command. When this is the case, NLP 502 is provided for deciphering the verbal control command, and the outputting the verbal control command to logic circuitry 503.

The apparatus shown in FIG. 5 may further comprise Wide-Area-Network (WAN) transceiver 501 configured to receive an identification of a public-safety event type, and output the identification to the logic circuitry.

Database 504 may comprising a mapping of public-safety event types to IoT devices, and mappings of control commands, public-safety event types, and primary IoT device identifications to secondary IoT devices.

Figure 6:
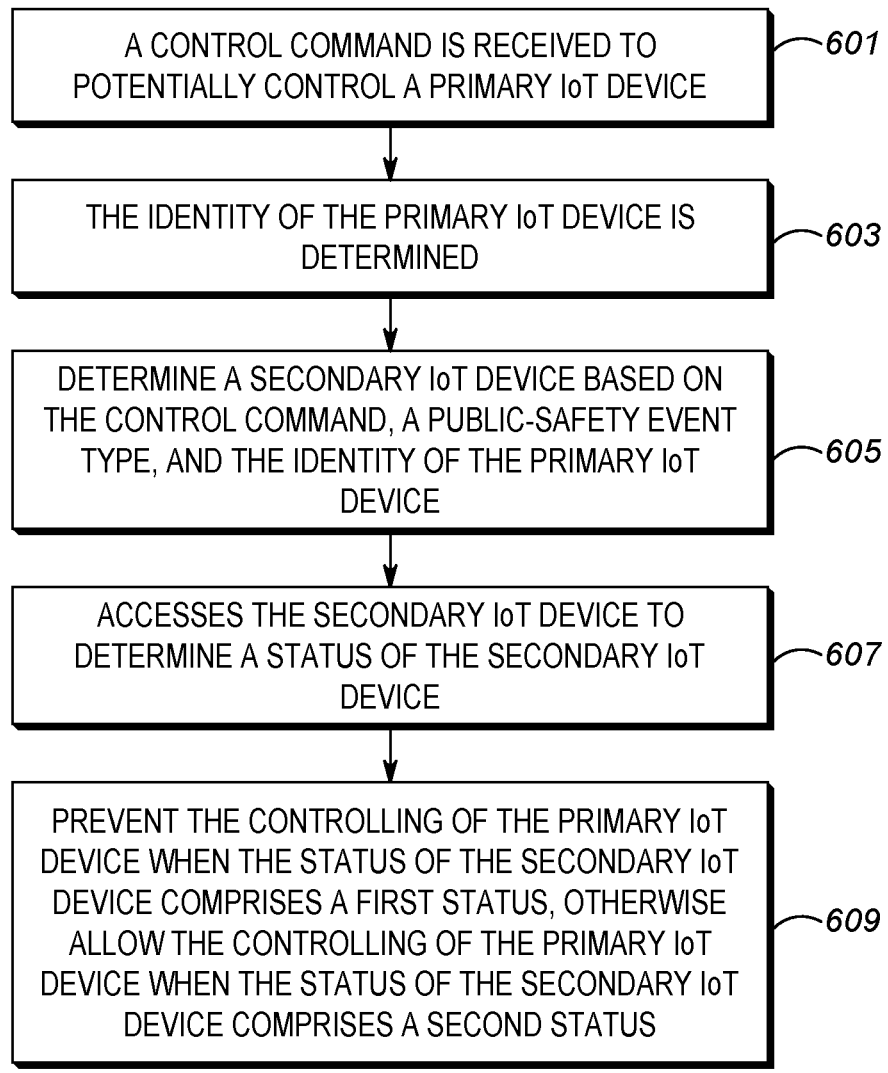
FIG. 6 is a flow chart showing operation of the PTT-to-Things server of FIG. 5.

FIG. 6 is a flow chart showing operation of the PTT-to-Things server of FIG. 5. The logic flow begins at step 601 where a control command is received by logic circuitry to potentially control a primary IoT device. At step 603 the identity of the primary IoT device is determined by logic circuitry 503. At step 605, logic circuitry 503 determines a secondary IoT device based on the control command, a public-safety event type, and the identity of the primary IoT device. Logic circuitry then accesses the secondary IoT device (via network interface 505) to determine a status of the secondary IoT device (step 607). At step 609, logic circuitry prevents the controlling of the primary IoT device when the status of the secondary IoT device comprises a first status, otherwise allowing the controlling of the primary IoT device when the status of the secondary IoT device comprises a second status.

As discussed, the control command may be received over a talkgroup associated with a primary IoT device, and the identity of the primary IoT device is determined by mapping the talkgroup to the identity of the primary IoT device.

Additionally, the primary IoT device may comprise a door, a light, a switch, or an actuator; and the control command for the primary IoT device comprises a command to lock/unlock the door, turn on/off the light, or actuate the switch or actuator.

As discussed above, the identification of the public-safety event type may be determined from a computer-aided dispatch (CAD) identification (ID).

Finally, when the control command comprises a verbal command, Natural-Language Processor (NLP) 502 is provided to decipher the verbal control command, and the outputting the verbal control command to the logic circuitry.

Once the secondary devices are known, a decision is made by PTT-to-Things server as whether or not to operate the primary IoT device. As discussed above, this decision is based on the sensor states of the secondary IoT devices. For example, a first sensor state may allow operating the primary IoT device, while a second sensor state may preclude operation of the IoT device.

In the foregoing specification, specific embodiments have been described. However, one of ordinary skill in the art appreciates that various modifications and changes can be made without departing from the scope of the invention as set forth in the claims below. For example, the above description illustrates the creation of a talkgroup during an emergency situation. As described, various IoT devices are identified, and added to the talkgroup. The newly-created talkgroup will aide an officer during the emergency situation. It should be noted that multiple talkgroups may be created for a single incident as described and claimed. For example, consider an emergency situation involving evacuation of individuals from a building. In this case it may be desirable to create two talk groups; one for doors to be opened and the second for doors to be closed during evacuation. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a transceiver configured to receive a control command to control a primary IoT device;
   logic circuitry configured to:
   determine an identity of the primary IoT device;
   determine a secondary IoT device based on the control command, a public-safety event type, and the identity of the primary IoT device;
   access the secondary IoT device to determine a status of the secondary IoT device;
   prevent the controlling of the primary IoT device when the status of the secondary IoT device comprises a first status;
   allow the controlling of the primary IoT device when the status of the secondary IoT device comprises a second status; and
   a database comprising a mapping of public-safety event types to IoT devices, and mappings of control commands, public-safety event types, and primary IoT device identifications to secondary IoT devices.

2. The apparatus of claim 1 wherein the control command is received over a talkgroup associated with a primary IoT device, wherein the control command is intended to control the primary IoT device, and wherein the identity of the primary IoT device is determined by mapping the talkgroup to the identity of the primary IoT device.

3. The apparatus of claim 1 wherein a network interface is coupled to the logic circuitry, the network interface configured to output the control command to an address of the primary IoT device in order to operate the IoT device.

4. The apparatus of claim 1 wherein the primary IoT device comprises a door, a light, a sensor, a switch, an actuator; and the control command for the primary IoT device comprises a command to lock/unlock the door, turn on/off the light, or actuate the switch or actuator.

5. The apparatus of claim 1 wherein the control command comprises a verbal command.

6. The apparatus of claim 5 further comprising a Natural-Language Processor (NLP) deciphering the verbal command, and outputting the verbal command to the logic circuitry.

7. The apparatus of claim 1 further comprising:
   a Wide-Area-Network (WAN) transceiver configured to receive an identification of a public-safety event type, and output the identification to the logic circuitry.

* * * * *